United States Patent
Kasimirsky (10) Patent No.: US 11,965,622 B2
(45) Date of Patent: Apr. 23, 2024

(54) BRACKET, SYSTEM AND METHOD FOR HANGING ARTICLES UNDER A STRUCTURE

(71) Applicant: Back Porch Innovations LLC, McDonald, PA (US)

(72) Inventor: Mark Kasimirsky, Canonsburg, PA (US)

(73) Assignee: Back Porch Innovations LLC, McDonald, PA (US)

( * ) Notice: Subject to any disclaimer, the term of this patent is extended or adjusted under 35 U.S.C. 154(b) by 0 days.

(21) Appl. No.: 18/049,671

(22) Filed: Oct. 26, 2022

(65) Prior Publication Data
US 2023/0131571 A1    Apr. 27, 2023

Related U.S. Application Data

(60) Provisional application No. 63/271,786, filed on Oct. 26, 2021.

(51) Int. Cl.
*F16M 13/02* (2006.01)
*A63G 9/12* (2006.01)
*A47G 7/04* (2006.01)

(52) U.S. Cl.
CPC ............. *F16M 13/02* (2013.01); *A63G 9/12* (2013.01); *A47G 7/042* (2013.01)

(58) Field of Classification Search
CPC ........... F16M 13/02; A63G 9/12; A47G 7/042
USPC ........................................................ 248/200
See application file for complete search history.

(56) References Cited

U.S. PATENT DOCUMENTS

| | | | | |
|---|---|---|---|---|
| 5,560,576 | A * | 10/1996 | Cargill | B60P 7/15 224/403 |
| D450,568 | S | 11/2001 | Sachs | |
| 6,568,648 | B1 * | 5/2003 | Ray | B63B 17/00 248/538 |
| 8,661,739 | B2 * | 3/2014 | Keenan | E04B 1/003 52/27 |
| 9,032,678 | B2 | 5/2015 | Shaw et al. | |
| D826,704 | S | 8/2018 | Wilson et al. | |
| D843,823 | S | 3/2019 | Bouchard | |
| 10,844,615 | B2 * | 11/2020 | Esh, Jr. | E04B 1/003 |
| 11,619,248 | B1 * | 4/2023 | Straney | F16M 13/022 248/229.12 |
| 2011/0099934 | A1 * | 5/2011 | Rhoad, II | E04B 9/363 52/506.06 |

(Continued)

FOREIGN PATENT DOCUMENTS

DE    8131985 U1    5/1982
DE    9000716 U1    3/1990

*Primary Examiner* — Todd M Epps
(74) *Attorney, Agent, or Firm* — Charles M. Yeomans, Esq.; Leech Tishman Fuscaldo & Lampl (57) ABSTRACT

The present invention is directed towards a system for hanging an article under a structure, the system comprising a structure comprising at least one plank; an article; and at least one bracket comprising a structure engaging portion structured and arranged to contact a top surface of at least one plank; a bottom extension portion structured and arranged to be coupled to the structure engaging portion and having a length that extends below a bottom surface of the plank; and an article engaging portion structured and arranged to be coupled to the article. Also disclosed are methods of hanging an article underneath a structure, and a bracket.

20 Claims, 9 Drawing Sheets

(56) References Cited

U.S. PATENT DOCUMENTS

2023/0045551 A1* 2/2023 Holmes ............ E04F 15/02044

* cited by examiner

BRACKET, SYSTEM AND METHOD FOR HANGING ARTICLES UNDER A STRUCTURE

CROSS-REFERENCE TO RELATED APPLICATIONS

This application claims the benefit of U.S. Provisional Patent Application Ser. No. 63/271,786, filed on Oct. 26, 2021, which is incorporated herein by reference.

FIELD OF THE INVENTION

The present invention is directed towards brackets, systems and methods for hanging articles under a structure.

BACKGROUND INFORMATION

Elevated structures are used for many purposes. For example, architectural structures provide support for roofs and overhangs as well as flooring. However, hanging articles from such structures if often done using methods that can damage the structure. For example, hanging materials underneath a structure typically involves the use of fasteners that are driven into the structure and leave damage to the structure when they are removed. A system for hanging an article under a structure that does not damage the structure is desired.

SUMMARY OF THE INVENTION

The present invention is directed to a system for hanging an article under a structure, the system comprising a structure comprising at least one plank; an article; and at least one bracket comprising a structure engaging portion structured and arranged to contact a top surface of at least one plank; a bottom extension portion structured and arranged to be coupled to the structure engaging portion and having a length that extends below a bottom surface of the plank; and an article engaging portion structured and arranged to be coupled to the article.

The present invention is also directed to a method of hanging an article underneath a structure using the system of the present invention, wherein the method comprises inserting the bottom extension portion of the bracket between two planks until the structure engaging portion contacts a top surface of the structure; and coupling the article engaging portion with the article.

The present invention is also directed to a bracket comprising a structure engaging portion structured and arranged to contact a top surface of at least one plank; a bottom extension portion structured and arranged to be coupled to the structure engaging portion and having a length that extends below a bottom surface of the plank; an article engaging portion structured and arranged to be coupled to the article; and a releasable bottom holder structured and arranged to be positioned onto the bottom extension portion to make contact with the bottom surface of the plank.

The present invention is further directed to a bracket comprising a structure engaging portion structured and arranged to contact a top surface of at least one plank; a bottom extension portion structured and arranged to be coupled to the structure engaging portion and having a length that extends below a bottom surface of the plank; an article engaging portion structured and arranged to be coupled to the article; and an extension arm comprising a movable jaw coupled with the bottom extension portion of the bracket, wherein the extension arm and movable jaw are structured and arranged to position the movable jaw underneath the bottom surface of the plank contacted by the structure engaging portion of the bracket and extend the movable jaw to contact the bottom surface of the plank.

DETAILED DESCRIPTION OF THE INVENTION

As shown in FIGS. 1-7, disclosed herein is a system 10 for hanging an article 300 under a structure 100, the system 10 comprising a structure 100 comprising at least one plank 200; an article 300; and at least one bracket 400 comprising a structure engaging portion 500 structured and arranged to contact a top surface 210 of at least one plank 200; a bottom extension portion 600 structured and arranged to be coupled to the structure engaging portion 500 and having a length that extends below a bottom surface 220 of the plank 200; and an article engaging portion 700 structured and arranged to be coupled to the article 300.

The structure 100 is not limited so long as it includes a plank 200. As used herein, the term "plank" is intended to refer to a support upon which the structure engaging portion 500 may contact. For example, the structure 100 may comprise voids between the planks 200 or within a plank 200 such that the bottom extension portion 600 may extend from the top of the plank through the structure 100 to reach the underside of the structure 100. The structure 100 may optionally comprise a plurality of planks 200, such as at least 2 planks 200, upon which the structure engaging portion(s) may contact.

As shown in FIGS. 1-4, 7, and 11, the structure 100 optionally may comprise a deck 110 or other similar structure having a plurality of planks 200 that form the structure 100. The deck 110 may optionally further include joists, beams, and posts in addition to the planks 200. Although the structure engaging portion 500 of the bracket 400 is expressed as being structured and arranged to contact the top surface 210 of a plank 200, the term plank 200 includes any portion of the deck 110 that is used to make the decking floor 120 and may include planks, joists, beams, and posts if they are exposed as part of the decking floor 120. As shown in FIGS. 1-4, 7, and 11, the deck 110 includes voids between the planks 200 such that the bottom extension portion 600 of the bracket 400 extends from the top of the deck flooring 120 through the deck 110 to reach the underside of the deck 110.

Figure 16:
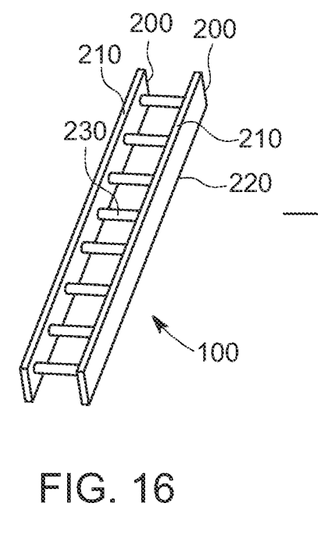
FIG. 16 is an isometric view of two planks with crossbars.
Figure 17:
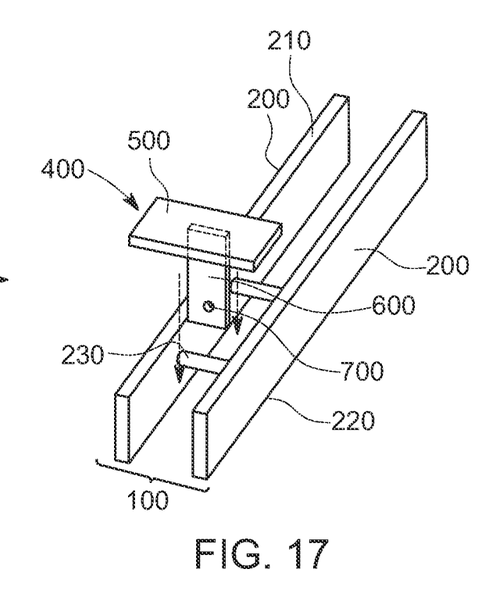
FIG. 17 is an isometric view of two planks with crossbars and an exemplary bracket to be installed between the crossbars.

As shown in FIGS. 16 and 17, the structure 100 may optionally further comprise crossmembers 230 in the void between the two planks 200. The crossmembers 230 may define slots through which the bracket 400 is inserted and may present movement of the bracket 400 in the void between the planks 200.

As shown in FIGS. 14A, 14B, 14C, and 15, the structure 100 may optionally comprise a structure 100 comprising at least one plank 200 and a plurality of legs 160 that support the at least one plank 200. As shown in FIGS. 14A, 14B, 14C, and 15, the structure 100 may comprise two planks 200 that form a void between the two planks 200 through which the bracket 400 may be inserted wherein the bottom extension portion 600 of the bracket 400 extends from the top surface of plank 210 to extend past the bottom surface of the plank 220. Alternatively, the structure 100 may comprise one plank 200 with having one or more apertures (i.e., voids) running the length of the plank 200 through which the bracket 400 may be installed.

As shown in FIGS. 16 and 17, the structure 100 may be a swing set 150 that may further comprise the crossmembers 230 as described above that restrict movement of the bracket 400 once installed between the planks 200. One or more bracket(s) 400 may be installed into the swing set 150 and connected to an article 300, such as, for example, the swings described below. This configuration may allow for the swing set 150 to be easily adjusted and reconfigured by the user to include different articles 300 supported by the bracket(s) 400 in the swing set 150.

The article 300 is not limited and may comprise, for example, a swing, a swinging bench, a hammock, a hanging basket, such as a hanging plant, a floating garden, a birdhouse, a hanging light, or any other article 300 that could be positioned beneath a structure 100. The swing may comprise a tire swing, a rope swing, a sling swing, a disc swing, a flat swing, a half-bucket swing, a full-bucket swing, a porch swing, a glider, a horse glider, or a web swing.

According to the present invention, the bracket 400 may comprise any suitable material. For example, the bracket 400 may comprise, metals, such as steel, aluminum, copper, cast iron, wrought iron, titanium, and the like, plastics, such as thermoplastics or thermoset plastics, silicone, wood, wood-plastic composite, stone, rubber, and the like.

The bracket 400 may comprise a t-bracket comprising two structure engaging portions as shown in 1-3, 5, 6, 8A, 8B, 8C, 9A, 9B, 9C, 10A, 10B, 10C, 11, 12A, 12B, 12C, 13A, 13B, 13C, and 17. Each of the structure engaging portions may be structured and arranged to contact a top surface 210 of two different planks 200, such as two adjacent planks 200 with the bottom extension portion 600 of the bracket 400 extending through the structure 100 between the two planks 200. The width of the structure engaging portions is not limited but should be wide enough to span the distance of the void between the two planks. For example, the structure engaging portions of the bracket 400 may be at least two times greater than the distance of the void between the planks in order to prevent the bracket 400 from falling into the void, supporting the object 300 without the use of fasteners or other mechanisms that damage the plank(s) 200.

The structure engaging portion 500 may optionally further comprise a material that is structured and arranged to restrict movement between the structure engaging portion 500 and the top surface 210 of the plank 200. The material may comprise a coating added to the structure engaging portion, a pad adhered to the structure engaging portion, an adhesive added to the structure engaging portion, or a coarse surface that may be added or integral to the structure engaging portion 500, and the material may increase friction between the structure engaging portion 500 and the top surface of the plank 210. For example, the coating may comprise a coating having an increased co-efficient of friction between the structure engaging portion 500 and top surface 210 of the plank 200. A non-limiting example includes a silicone resin. The coating may be present over the structure engaging portion 500 alone and/or may be coated over other parts of the bracket 400, including the entire bracket 400. The pad may comprise any material that increases the co-efficient of friction between the structure engaging portion 500 and top surface 210 of the plank 200. For example, the pad may comprise rubber or silicone among other possible materials. The adhesive may be used to adhere the structure engaging portion 500 to the top surface 210 of the plank 200. For example, the adhesive may comprise a pressure sensitive adhesive. The coarse surface may include a roughened surface of the structure engaging portion 500 or a coarse material that is added to the structure engaging portion. For example, a piece of sandpaper may be adhered to the structure engaging portion 500 in order to increase friction between the structure engaging portion 500 and top surface 210 of the plank 200.

Figure 4:
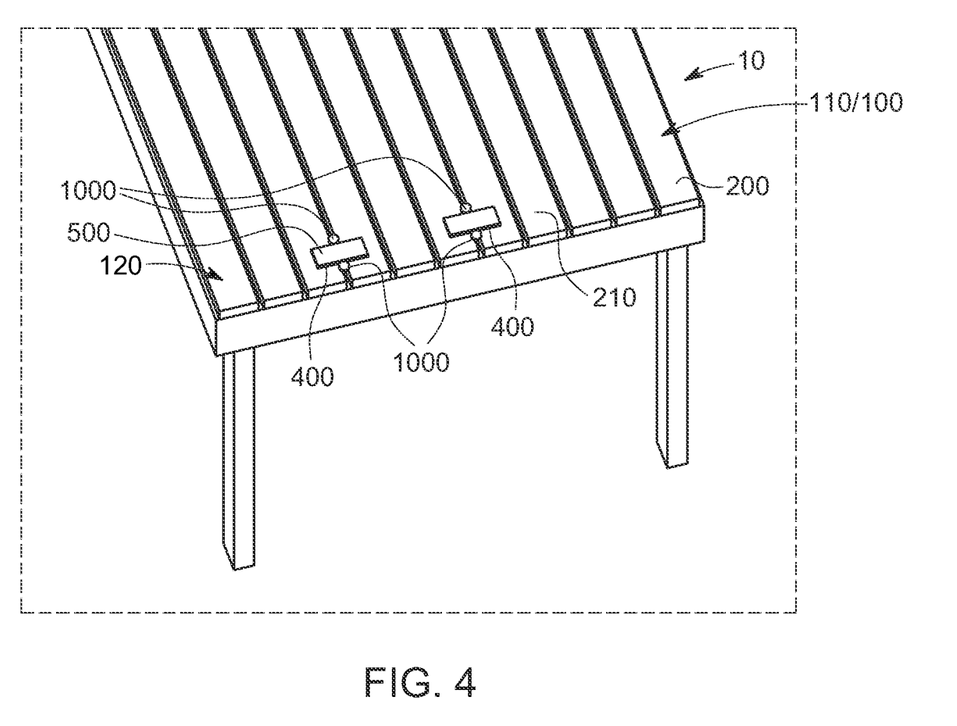
FIG. 4 is an isometric side view of two exemplary brackets installed in a deck floor having rubber stoppers on either side of the bracket.
Figure 7:
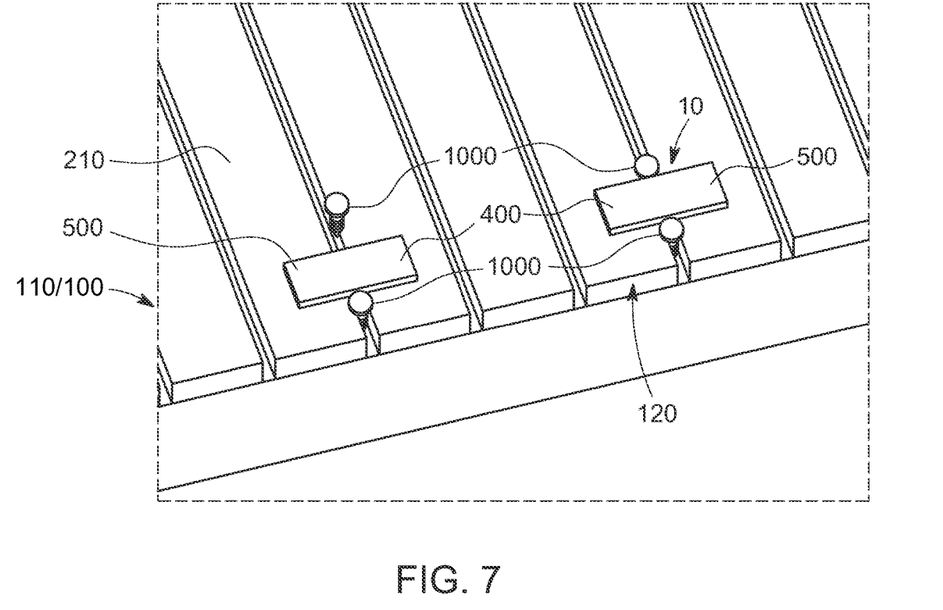
FIG. 7 is a top isometric view of two exemplary brackets installed in a deck floor having rubber stoppers on either side of the bracket.
Figure 8A:
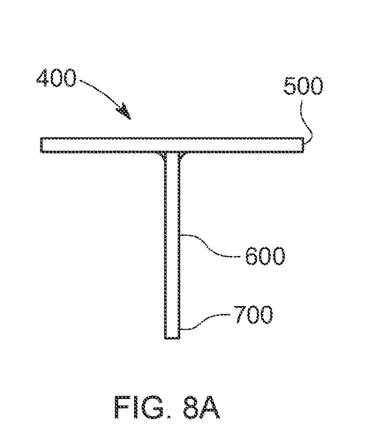
FIGS. 8A, 8B, and 8C are profile (8A), arial (8B), and spin (8C) isometric views of an exemplary bracket of the present invention.
Figures 8B, 8C:
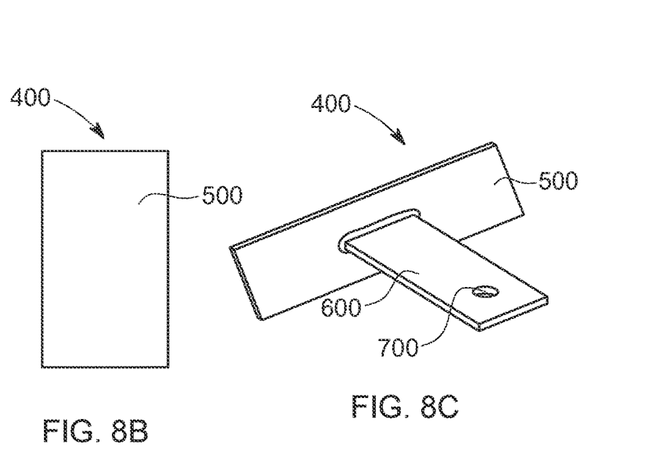
Figure 9A:
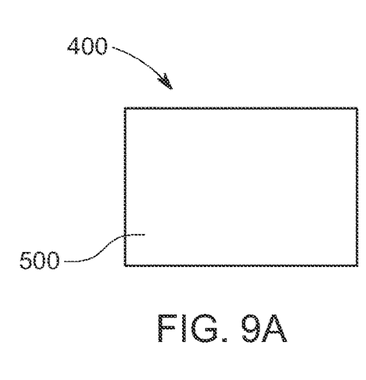
FIGS. 9A, 9B, and 9C are profile (9A), arial (9B), and spin (9C) isometric views of an exemplary bracket of the present invention.
Figures 9B, 9C:
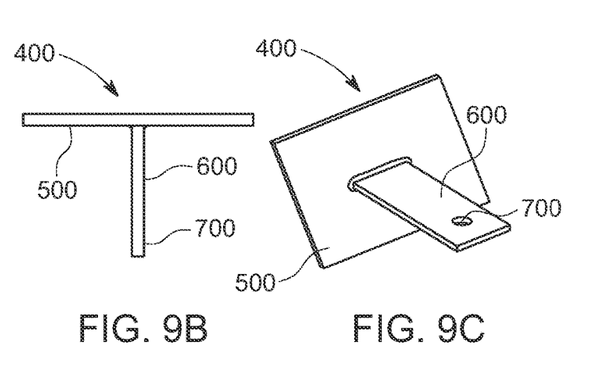
Figure 10A:
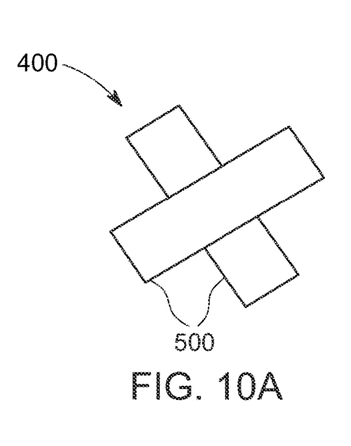
FIGS. 10A, 10B, and 10C are profile (10A), arial (10B), and spin (10C) isometric views of an exemplary bracket of the present invention.
Figures 10B, 10C:
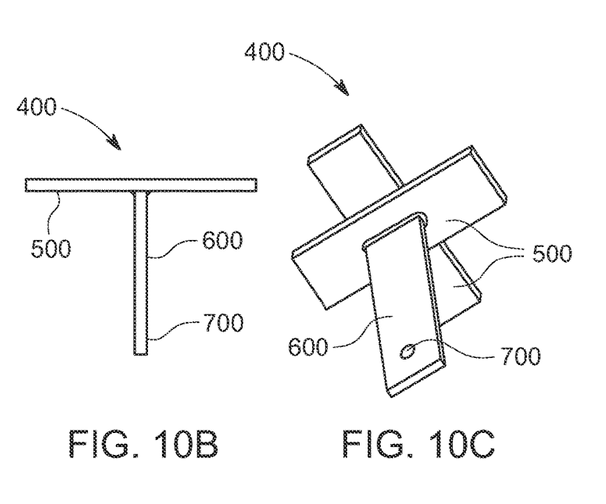
Figure 11:
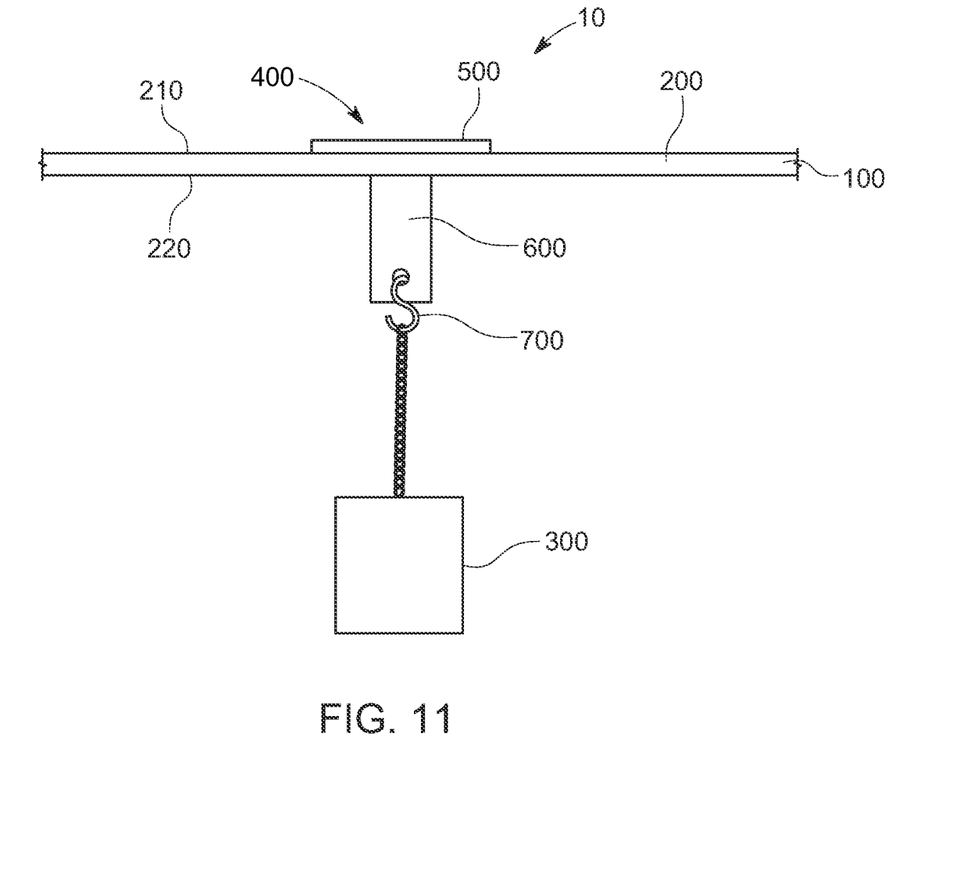
FIG. 11 is a side view of an exemplary system of the present invention having a bracket installed in a structure and supporting an article.
Figure 12A:
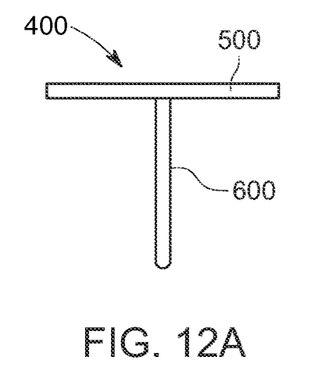
FIGS. 12A, 12B, and 12C are profile (12A), spin (12B), and alternate profile (12C) isometric views of an exemplary bracket of the present invention.
Figure 12B:
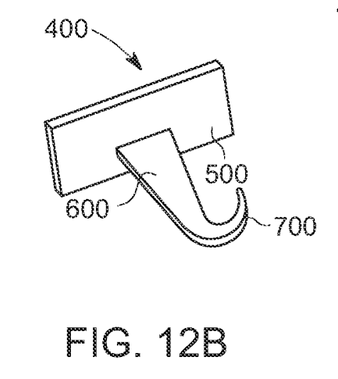
Figure 12C:
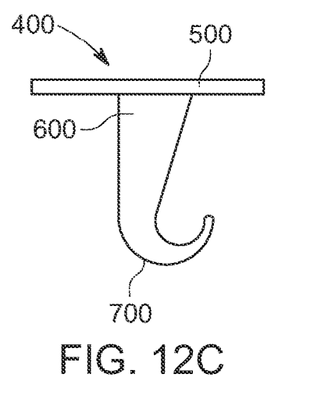
Figure 13A:
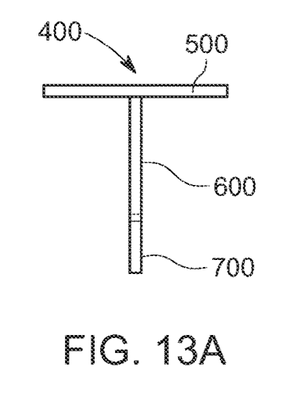
FIGS. 13A, 13B, and 13C are profile (13A), spin (13B), and alternate profile (13C) isometric views of an exemplary bracket of the present invention.
Figure 13B:
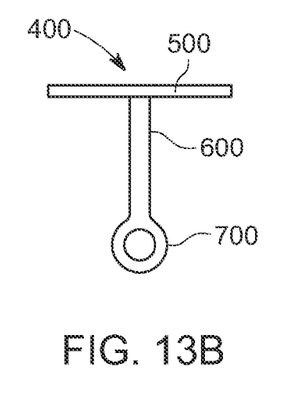
Figure 13C:
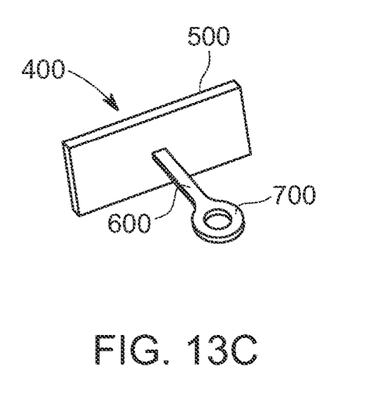
Figure 14A:
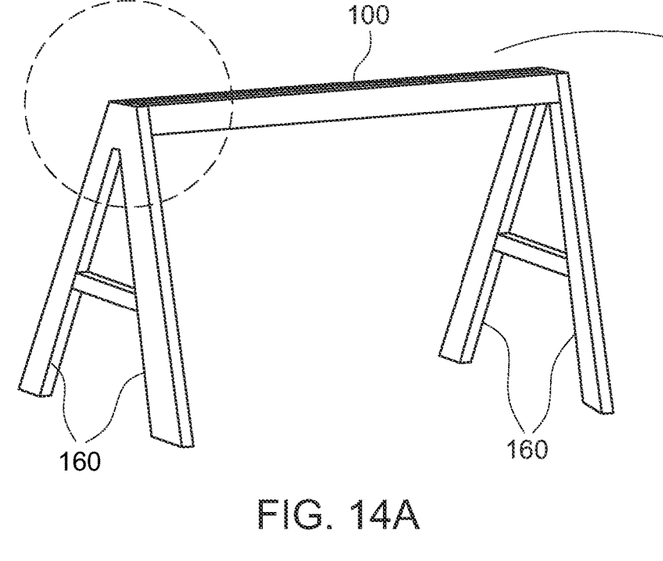
FIG. 14A is an isometric view of an exemplary structure.
Figure 14B:
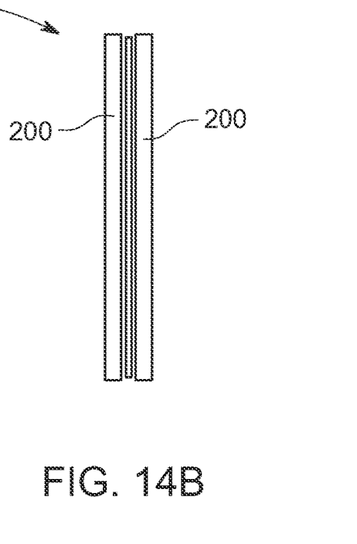
FIG. 14B is a top view of the planks of an exemplary structure.
Figure 14C:
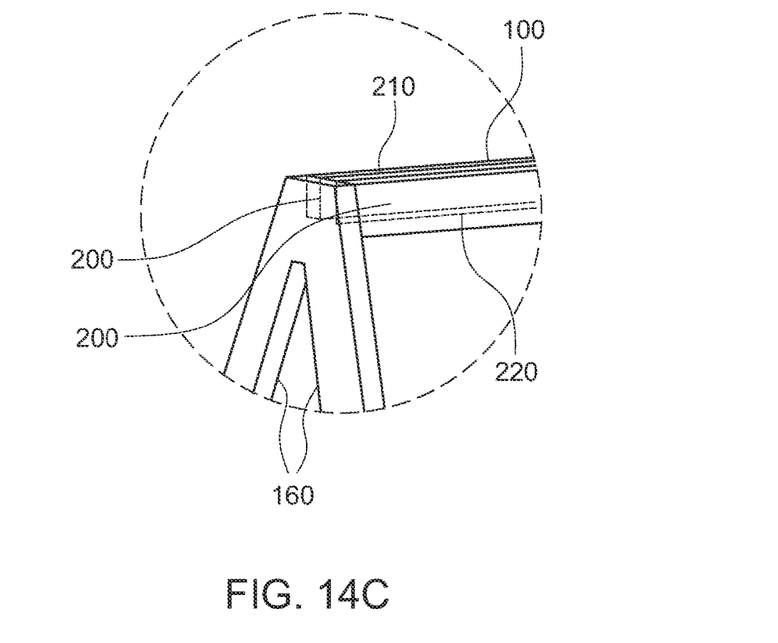
FIG. 14C is an isometric view showing the planks connected to the legs of an exemplary structure.

As shown in FIGS. 4 and 7, the system 10 may optionally further comprise one or more rubber stoppers 1000 that may be placed in the void between the planks 200 next to the structure engaging portion 500 of the bracket 400 to prevent the bracket 400 from moving in the void. Although referred to as rubber, the rubber stoppers 1000 may comprise any suitable material, such as, for example, rubber, silicone, cork, wood, plastic, wood-plastic composites, and the like.

As shown in FIGS. 1-3, 5, 6, 8A, 8B, 8C, 9A, 9B, 9C, 10A, 10B, 10C, 11, 12A, 12B, 12C, 13A, 13B, 13C, and 17, the bracket 400 further comprises a bottom extension portion 600 structured and arranged to be coupled to the structure engaging portion 500 and having a length that extends below a bottom surface 220 of the plank 200. The bottom extension portion 600 is not limited and may comprise various structures so long as the thickness of the bottom extension portion 600 does not exceed the void between the planks 200 that would restrict the ability to extend between the planks 200 to the bottom surface 220 of the planks 200, and the length is sufficient to extent past the bottom surface 220 of the planks 200. For example, as shown in FIGS. 1, 2, 3, 8A, 8B, 8C, 11, the bottom extension portion 600 may comprise a rectangular shape, but the bottom extension portion 600 may also comprise any geometric shape, for example, as shown in FIGS. 12A, 12B, 12C, 13A, 13B, and 13C, and the bottom extension portion 600 may be a unitary piece or a hollow piece.

Figure 6:
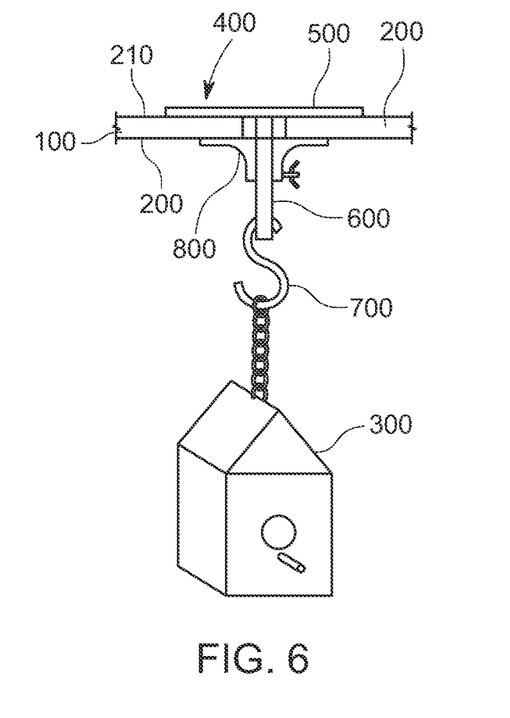
FIG. 6 is a side view of an exemplary system of the present invention having a bracket having a releasable bottom holder.

As shown in FIG. 6, the bracket 400 may optionally further comprise a releasable bottom holder 800 that is structured and arranged to be positioned onto the bottom extension portion 600 to make contact with the bottom surface 220 of the plank 200 and secure the bracket 400 in place. The releasable bottom holder 800 is not limited and may comprise any suitable mechanism to be secured to the bottom extension portion 600. For example, the releasable bottom holder 800 may comprise an aperture through which the bottom extension portion 600 is positioned and a wingnut that can be tightened to secure the releasable bottom holder 800 to the bottom extension portion 600. In another example, the bottom extension portion 600 may comprise a series of serrations and the releasable bottom holder 800 may comprise a ratchet mechanism to secure the releasable bottom holder 800 to the bottom extension portion 600. However, in all cases the securing mechanism should avoid causing damage to the structure 100 and only be used to further secure the bracket 400.

Figure 5:
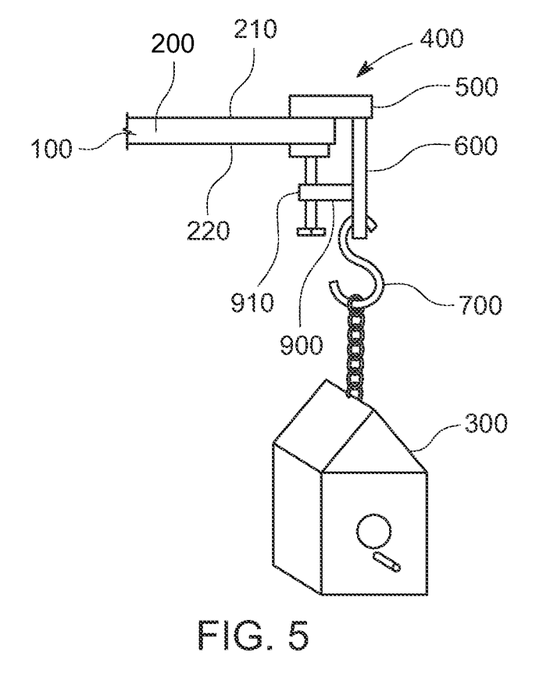
FIG. 5 is a side view of an exemplary system of the present invention having a bracket having an extension arm and movable jaw installed onto a plank of a structure.

As shown in FIG. 5, the bracket 400 may optionally further comprise an extension arm 900 comprising a movable jaw 910 coupled with the bottom extension portion 600 of the bracket 400, wherein the extension arm 900 and movable jaw 910 are structured and arranged to position the movable jaw 910 underneath the bottom surface 220 of the plank 200 contacted by the structure engaging portion 500 of the bracket 400 and extend the movable jaw 910 to contact a bottom surface 220 of the plank 200. The movable jaw 910 may be tightened to secure the bracket 400 to the plank 200 and restrict movement of the bracket 400. The extension arm 900 comprising the movable jaw 910 may be coupled with the engaging portion or bottom extension portion 600 after the bottom extension portion 600 has been positioned between the planks 200. Accordingly, the bottom extension portion 600 may be structured and arranged to couple with the extension arm 900 comprising the movable jaw 910.

The bracket 400 may optionally further comprise a bottom structure engaging portion 500 releasably coupled to the bottom extension portion 600 of the bracket 400 and structured and arranged to contact a bottom surface 220 of at least one plank 200. For example, the bottom structure engaging portion 500 may comprise a plate having a center aperture wherein the bottom extension portion 600 can be placed through the aperture and the bottom extension portion 600 may comprise teeth that releasably ratchet with the plate. The plate may be extended over the bottom extension portion 600 until it contacts the bottom surface 220 of the plank 200 and may be ratcheted in place against the bottom surface 220 of the plank 200.

The bracket 400 may optionally be free of fasteners that couple the bracket 400 and any plank 200 or of any nail-like points that extend from the structure engaging portion 500 that would contact the top surface 210 of the plank 200. Accordingly, the bracket 400 of the present invention can be installed without damaging the structure or any planks 200 with fasteners, nails, or any other component that would damage or pierce the structure 100 material(s).

As shown in FIGS. 1-3, 5, 6, 8A, 8B, 8C, 9A, 9B, 9C, 10A, 10B, 10C, 11, 12A, 12B, 12C, 13A, 13B, 13C, and 17, the bracket 400 further comprises an article engaging portion 700 structured and arranged to be coupled to the article 300. The article engaging portion 700 is not limited and may comprise any suitable structure that could be used to couple to an article 300. The article engaging portion 700 may comprise an aperture extending through the bottom extension portion 600 of the bracket 400, and a structure may be connected to the article engaging portion 700 aperture and the article 300, such as, for example, a ring, an S-hook, a carabiner, or any other suitable structure. Alternatively, the article engaging portion 700 may comprise a hook structure at the bottom of the bottom extension portion 600, or may comprise a ring, S-hook, carabiner, or any other suitable structure that is built into the bottom extension portion 600.

The article engaging portion 700 may be coupled to the article 300 through use of a line between the article engaging portion 700 and article 300. For example, the line may comprise a rope, a chain, a rubber, a plastic, a cord, or a cable, any combination thereof. The line allows for more flexibility and movement of the system, and may be useful for a swing, a hanging basket, or any other article 300.

Figure 1:
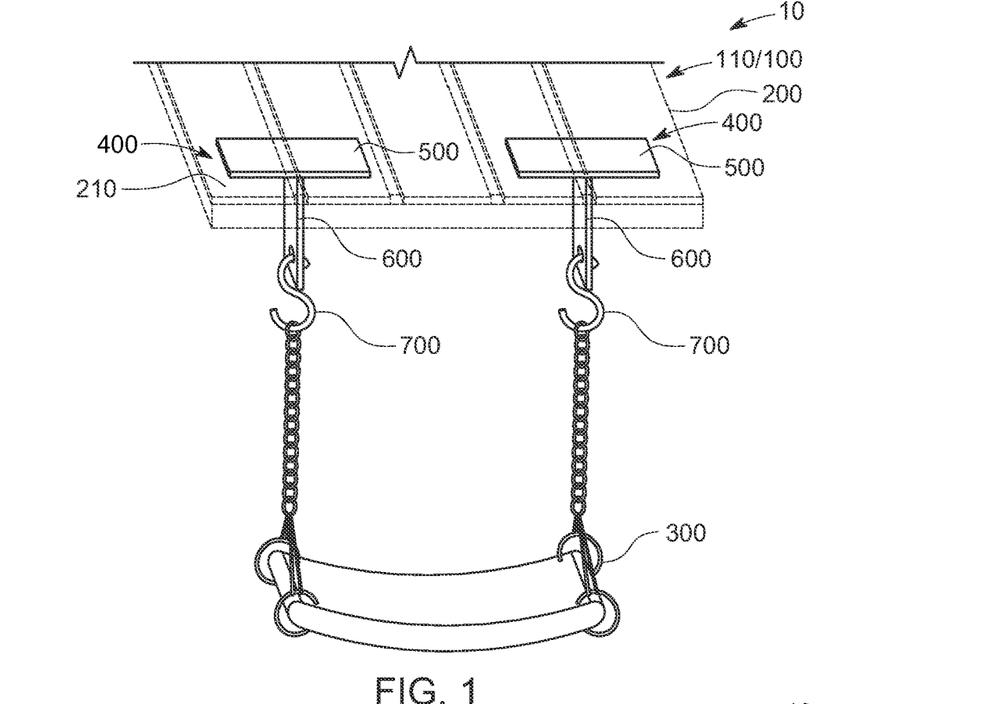
FIG. 1 is an isometric side view of an exemplary system of the present invention that includes two brackets to hang a swing.
Figure 2:
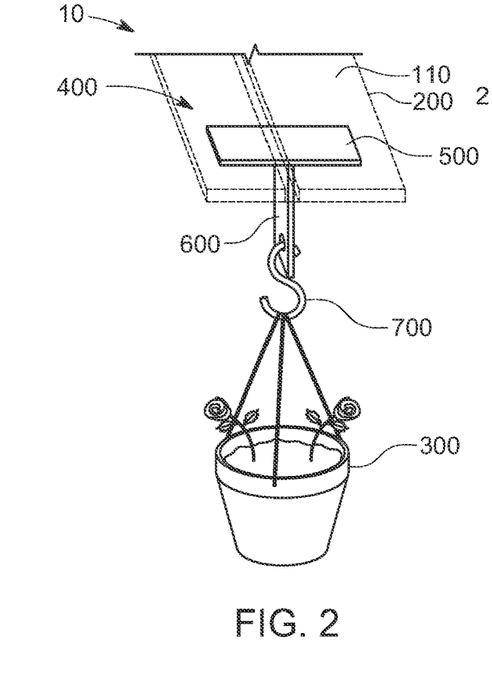
FIG. 2 is an isometric side view of an exemplary system of the present invention that includes one bracket to hang a potted plant.
Figure 3:
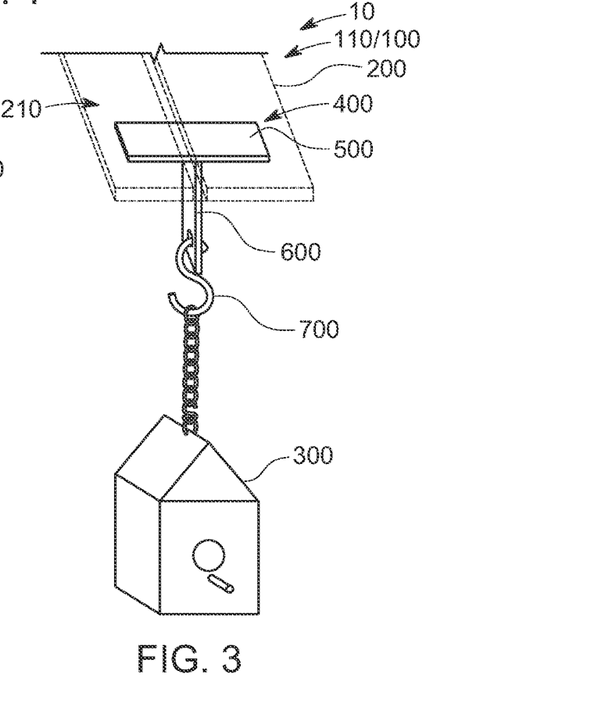
FIG. 3 is an isometric side view of an exemplary system of the present invention that includes one bracket to hang a birdhouse.
Figure 15:
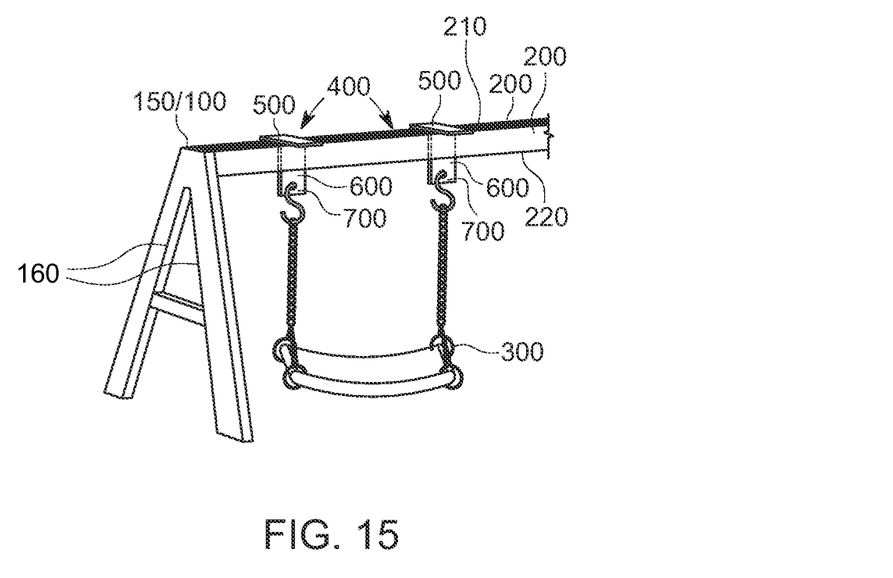
FIG. 15 is an isometric view of an exemplary system of the present invention that includes a swing set structure and two brackets that hang a swing.

The system 10 of the present invention may optionally comprise at least two brackets 400. The two brackets 400 may be positioned on the structure 100 with each of the article engaging members engaged to a portion of the article 300 or a line extending from the article 300. For example, as shown in FIGS. 1 and 15, two brackets 400 may be installed on the structure 100, and each engaging member of the brackets 400 may be coupled to a line extending from a swing to install a swing underneath the structure 100.

The present invention is also directed to a method of hanging an article 300 underneath a structure 100 using the system 10 of any of the present invention, wherein the method comprises inserting the bottom extension portion 600 of the bracket 400 between two planks 200 or through an aperture in a plank 200 until the structure engaging portion 500 contacts the top surface 210 of the plank 200; and coupling the article engaging portion 700 with the article 300. Multiple brackets 400 may be installed according to this method depending upon the article 300 to be hung underneath the structure 100.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" bracket, "a" plank, and "an" article, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Whereas specific embodiments of the invention have been described in detail, it will be appreciated by those skilled in the art that various modifications and alternatives to those details could be developed in light of the overall teachings of the disclosure. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A system for hanging an article under a structure, the system comprising:
   a structure comprising at least one plank;
   an article; and
   at least one bracket comprising a structure engaging portion structured and arranged to contact a top surface of the at least one plank; a bottom extension portion structured and arranged to be coupled to the structure engaging portion and having a length that extends below a bottom surface of the plank; and an article engaging portion structured and arranged to be coupled to the article.

2. The system of claim 1, wherein the structure comprises a deck.

3. The system of claim 1, wherein the structure comprises a swing set.

4. The system of claim 1, wherein the plank comprises at least two planks.

5. The system of claim 4, wherein the bracket comprises a t-bracket comprising two structure engaging portions structured and arranged to contact a top surface of the two planks comprising two different planks.

6. The system of claim 1, wherein at least one structure engaging portion of the bracket further comprises a coarse surface that contacts the top surface of the plank.

7. The system of claim 1, wherein at least one structure engaging portion of the bracket further comprises rubber or a silicone resin that contacts the top surface of the plank.

8. The system of claim 1, wherein at least one structure engaging portion of the bracket further comprises a pressure sensitive adhesive that contacts the top surface of the plank.

9. The system of claim 1, wherein the bracket further comprises an extension arm comprising a movable jaw coupled with the bottom extension portion of the bracket, wherein the extension arm and movable jaw are structured and arranged to position the movable jaw underneath the plank contacted by the structure engaging portion of the bracket and extend the movable jaw to contact a bottom surface of the plank.

10. The system of claim 1, wherein the bracket further comprises a bottom structure engaging portion releasably coupled to the bottom extension portion of the bracket and structured and arranged to contact a bottom surface of at least one plank.

11. The system of claim 1, wherein the article engaging portion comprises an aperture extending through the bottom extension portion, a hook, or a carabiner.

12. The system of claim 1, wherein the system comprises at least two brackets.

13. The system of claim 1, wherein the brackets are free of fasteners that couple the bracket and any plank.

14. The system of claim 1, wherein the system further comprises rubber stoppers positioned next to the structure engaging portion.

15. The system of claim 1, wherein the article further comprises at least one line that may be coupled with the article engaging portion.

16. The system of claim 1, wherein the article comprises a swing.

17. The system of claim 1, wherein the article comprises a swinging bench, a hammock, a hanging basket, a floating garden, a birdhouse, or a hanging light.

18. A method of hanging an article underneath a structure using the system of claim 1, wherein the method comprises inserting the bottom extension portion of the bracket between two planks until the structure engaging portion contacts a top surface of the structure; and coupling the article engaging portion with the article.

19. A bracket comprising:
   a structure engaging portion structured and arranged to contact a top surface of at least one plank;
   a bottom extension portion structured and arranged to be coupled to the structure engaging portion and having a length that extends below a bottom surface of the plank;
   an article engaging portion structured and arranged to be coupled to an article; and
   a releasable bottom holder structured and arranged to be positioned onto the bottom extension portion to make contact with the bottom surface of the plank.

20. A bracket comprising:
   a structure engaging portion structured and arranged to contact a top surface of at least one plank;
   a bottom extension portion structured and arranged to be coupled to the structure engaging portion and having a length that extends below a bottom surface of the plank;

an article engaging portion structured and arranged to be coupled to an article; and an extension arm comprising a movable jaw coupled with the bottom extension portion of the bracket, wherein the extension arm and movable jaw are structured and arranged to position the movable jaw underneath the bottom surface of the plank contacted by the structure engaging portion of the bracket and extend the movable jaw to contact the bottom surface of the plank.

* * * * *